United States Patent Office 2,734,586
Patented Feb. 14, 1956

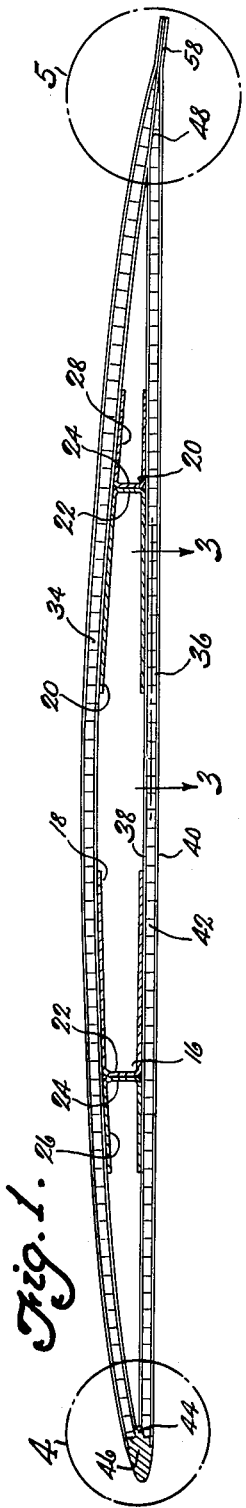

2,734,586

LOW-DENSITY PROPELLER BLADE

Clifford B. Wright and John F. Haines, Dayton, Ohio, assignors to General Motors Corporation, Detroit, Mich., a corporation of Delaware Application April 14, 1951, Serial No. 221,006

1 Claim. (Cl. 170—159)

This invention relates to propeller blades for large diameter propellers and has for an object to provide a blade that will stand the stresses of powered rotation without setting up destructive vibration.

A propeller blade of low mass is provided for by the use of a box-like hollow structure provided by flanges of formed sheet metal struts, whose airfoil section is completed by the use of a low-density skin. Such a skin may be made up of a pair of spaced imperforate sheets disposed on either side of a filling of corrugated or other low-density material.

Further objects and advantages of the present invention will be apparent from the following description, reference being had to the accompanying drawings wherein a preferred embodiment of the present invention is clearly shown.

In the drawing:

Fig. 1 is a transverse sectional view of a propeller blade substantially as indicated by the line and arrows 1—1 of Fig. 2.

Fig. 2 is a view on reduced scale, showing a plan form of the blade with a portion broken away for illustration and details.

Fig. 3 is an enlarged view of one form of low-density material which fills the sandwich skin substantially as indicated by the line and arrows 3—3 of Fig. 1.

Fig. 4 is an enlarged sectional detail of the leading edge of the blade substantially as indicated by the circle 4 in Fig. 1.

Fig. 5 is a large sectional view of the trailing edge of the blade substantially as indicated by the circle 5 of Fig. 1.

Referring to the drawings, a main structural member 10 extends substantially the full length of the blade and consists of a pair of metal spars 12 secured to a root portion 14. The outer ends of the spars 12 are coextensive with the blade tip, as depicted in Fig. 2. The spars 12 are overlapped with the end of the root 14 as at 16 where it is welded by appropriate methods. The spars 12 comprise channel members 18 and 20 whose bridge portions 22 are welded or bonded to bridge portions 24 of the channel members 26 and 28 as shown in Fig. 1. The inner flanges of the channel members 18 and 20 are welded or bonded to the root 14 somewhat as indicated at 30 and 32.

Covering the box-like structure provided by the spars 12 there is a camber surface skin 34 and a thrust surface skin 36 each of which comprises an impervious sheet 40 more or less uniformly spaced and bonded to an impervious sheet 38 by a low-density filler material 42. The sandwich skin is the result of a built-up process by which the impervious sheets are laid or stretched over the box-like structure and bonded to the flanges on opposite sides of the channel members 26, 18, 20 and 28. These sheets 38 as shown in Fig. 4 are welded or bonded to a web 44 of a high-density leading edge strip 46. The trailing edge of the blade is formed by bonding the edges of the sheets 38 as at 48 in Fig. 5.

It is preferred that the sheets 38 and 40 be relatively thin gauge stainless steel and that the bond of those sheets to the leading edge strip 46 and to the spar 12 be accomplished by roll weld. Similarly the bond of the sheets at 48 may be accomplished by welding. The filler material 34 of the sandwich skin may be of corrugated, crumpled, highly porous or fibrous material, any of which provides a relatively uniform spacing between the sheets 38 and 40 and rigid enough to maintain uniform spacing between the sheets when the bonding material is set. A preferred form of low-density material comprises a loculate or favose section of metal foil corrugated preformed or crinkled to provide a honeycomb section somewhat as indicated in Fig. 3, and which might result from reversely bending or corrugating narrow ribbons of metal foil 50, 52 and so disposing them that alternate bends are adjacent one another. Bonding material between the bends operates to secure the ribbons together in honeycomb fashion such that the edges of the ribbons are normal or at substantially right angles to the surface of the sheets 38 and 40. Such a filling material is disposed over the inner sheets 38 which have been coated with a resinous bonding material, and then the sheets 40 whose inner surfaces are similarly coated with bonding material are disposed over the outside surface of the low-density material 42 whereupon the edges of the sheets 40 are roll welded to the leading edge strip 46 as indicated by 56. The trailing edge portion of the outer sheets 40 are brought together and roll welded as indicated at 58.

By using a resinous bonding material between the low-density filling 42 and the enclosing sheets 38 and 40 a secure bond for the structure may be accomplished by processing at a temperature of 350° F. or thereabouts, all of which is known to those experienced in the art.

While the embodiment of the present invention as herein disclosed, constitutes a preferred form, it is to be understood that other forms might be adopted.

What is claimed is as follows:

A propeller blade including in combination, an airfoil section, a root section, a pair of spars extending substantially the full length of said airfoil section, each of said spars comprising a pair of channel members, the bridge portions of which are secured together and the flange portions of which extend laterally and conform to the contour of said airfoil section, means joining the flange portions of one channel member of each spar to the root section, said airfoil section including a leading edge, a trailing edge, a thrust surface and a camber surface, each surface being constituted by a low density skin comprising inner and outer impervious sheets with a layer of low density core material disposed between and bonded to the impervious sheets, means joining the trailing edge portions of the impervious sheets to form said trailing edge of the airfoil section, the leading edge of the airfoil section comprising a high density strip having a laterally extending web, means joining the leading edge portions of the inner impervious sheets to opposite sides of said web and means joining the leading edge portions of the outer impervious sheets to the outer surfaces of said strip, and means joining the flange portions of said channel members to the inner impervious sheets of the thrust and camber surfaces whereby the airfoil section is rigidly supported by said spars.

(References on following page)

References Cited in the file of this patent

UNITED STATES PATENTS

| | | |
|---|---|---|
| 1,311,205 | Belcher | July 29, 1919 |
| 1,345,101 | Perry | June 29, 1920 |
| 1,454,977 | Middleton | May 15, 1923 |
| 1,789,240 | Leitner et al. | Jan. 13, 1931 |
| 2,056,563 | Budd | Oct. 6, 1936 |
| 2,376,854 | Saunders | May 22, 1945 |
| 2,460,351 | Hoffman | Feb. 1, 1949 |
| 2,493,139 | Heath | Jan. 3, 1950 |
| 2,556,470 | Del Mar | June 12, 1951 |
| 2,580,363 | Schnitt | Dec. 25, 1951 |
| 2,609,068 | Pajak | Sept. 2, 1952 |

FOREIGN PATENTS

| | | |
|---|---|---|
| 705,691 | France | Feb. 8, 1930 |
| 706,340 | France | Mar. 30, 1931 |

OTHER REFERENCES

ANC-23 (Sandwich Construction for Aircraft), part I, February 1951. (Pp. 9 and 10, art's. 2.10, 2.1000, 2.1001, and 2.1002; p. 11, col. 1, second paragraph from bottom; p. 36, art. 4.005; and p. 38, Figs. 4–13.)